United States Patent [19]

Hewitt

[11] Patent Number: 4,647,892
[45] Date of Patent: Mar. 3, 1987

[54] DUAL MAGNETIC SENSOR

[76] Inventor: John T. Hewitt, 129 Sheldon St., El Segundo, Calif. 90245

[21] Appl. No.: 623,232

[22] Filed: Jun. 21, 1984

[51] Int. Cl.[4] .................. H01F 15/02; H01F 27/30
[52] U.S. Cl. .................................... 336/83; 310/155;
324/208; 324/243; 336/90; 336/110
[58] Field of Search ........... 336/110, 83, 221, DIG. 2,
336/90, 92; 310/155; 324/173, 174, 208, 243,
179, 67, 242, 234

[56] References Cited

U.S. PATENT DOCUMENTS

| 1,287,251 | 12/1918 | Darley | 324/67 |
|---|---|---|---|
| 3,371,272 | 9/1964 | Stanton | 324/243 X |
| 3,510,858 | 5/1970 | Flanagan | 340/187 |
| 3,586,964 | 6/1971 | Strauch | 336/83 X |
| 3,619,678 | 11/1971 | Ruof | 310/155 |
| 3,838,372 | 9/1974 | Damijonaitis | 336/110 |
| 3,882,436 | 5/1975 | Chass | 336/83 |
| 4,097,756 | 6/1978 | Gee | 336/110 X |
| 4,256,986 | 3/1981 | Anderson | 310/155 |
| 4,268,771 | 5/1981 | Lace | 310/155 |
| 4,276,489 | 6/1981 | Dron et al. | 310/155 |

Primary Examiner—Thomas J. Kozma
Attorney, Agent, or Firm—Fulwider Patton Rieber Lee & Utecht

[57] ABSTRACT

A dual magnetic sensor utilizing a pair of separate coils to generate separate and isolated signals from a single pickup point, each signal having a power output at least equal to that of a conventional single coil sensor, the dual sensor having physical dimensions making it substitutable for a conventional single coil sensor.

2 Claims, 3 Drawing Figures

DUAL MAGNETIC SENSOR

BACKGROUND OF THE INVENTION

1. Field of the Invention

This invention relates to motion sensors, and more particularly to sensors of angular velocity for electronic speedometers or the like.

2. Description of the Prior Art

Numerous sensors have been developed for measuring the angular velocity of a rotor. One such sensor depends for operation upon a magnetic field generated by a permanent magnet or an electromagnet. The magnet is positioned so that the lines of flux of the magnetic field pass through a toothed or apertured ferromagnetic part of the rotor. As the rotor turns, the passage of the rotor teeth or apertures through the magnetic field causes flux changes, inducing an alternating current in an associated sensing coil which is proportional to the angular velocity of the rotor. The output of the sensing coil is applied to an auxiliary electronic device, such as an electronic tachometer, to provide some desired function or display.

There are many instances in which a sensing of the angular velocity of a rotor is used to operate more than one electronic device. For example, a truck might be equipped with an electronic speedometer and also an anti-skid system, both of which depend for operation upon a sensing of the angular velocity of the vehicle drive shaft. Typically, if both devices are to function at the same time, two different sensors would be used which are each separately coupled to the same rotor. Using a single conventional sensor coil would be impractical because the usual multiple electronic devices used in such a situation are usually sufficiently sensitive that they would interfere with each other. There is a need for a means to obtain electrically isolated outputs from a single sensor associated with a rotor or the like, and particularly from a single sensor occupying no more physical space or different mechanical mounting arrangement than the conventional single sensors presently in use.

Many patents disclose two coils either coaxially wound or positioned in juxtaposition to one another. Indeed, such an arrangement of two coils is elementary to the functioning of a transformer. Typical of these patents are: U.S. Pat. No. 3,510,858, issued to Flanagan on May 5, 1970; U.S. Pat. No. 3,586,964, issued to Strauch on June 22, 1971; U.S. Pat. No. 3,882,436, issued to Chass on May 6, 1975; U.S. Pat. No. 4,035,751, issued to Walthew on July 12, 1977; and U.S. Pat. No. 4,097,756, issued to Gee on June 27, 1978. Each of these patents discloses a pair of coils designed to interact with each other, either through coupled fields, as in a transformer, or through direct electrical inter-connection of the coils. None of these patents discloses a sensor adapted for association with a single rotor and characterized by outputs isolated from each other but each separately indicative of the rotor revolutions.

SUMMARY OF THE INVENTION

According to the present invention, two coils are coaxially wound upon the same bobbin in electrically insulated relationship. The bobbin internally mounts a pole piece and is fitted within a permanent magnet, with the complete assembly being surrounded by a suitable housing. The bobbin, permanent magnet, and housing are sized and configured to fit within the space occupied by a conventional single coil sensor, being completely mechanically interchangeable with such a sensor. The electrically separate coils operate like two single sensors in the same housing, the output of each coil being electrically isolated from that of the other coil.

In one embodiment the coils and permanent magnet are enclosed by a sleeve or shim or ferromagnetic material which concentrats the magnetic lines of force and has the effect of increasing the output of each coil compared to a comparably sized and configured conventional single coil sensor.

Other objects and features of this invention will become apparent to those skilled in the art from consideration of the following description taken in connection with the accompanying drawings.

DESCRIPTION OF THE PREFERRED EMBODIMENT

Figure 1:
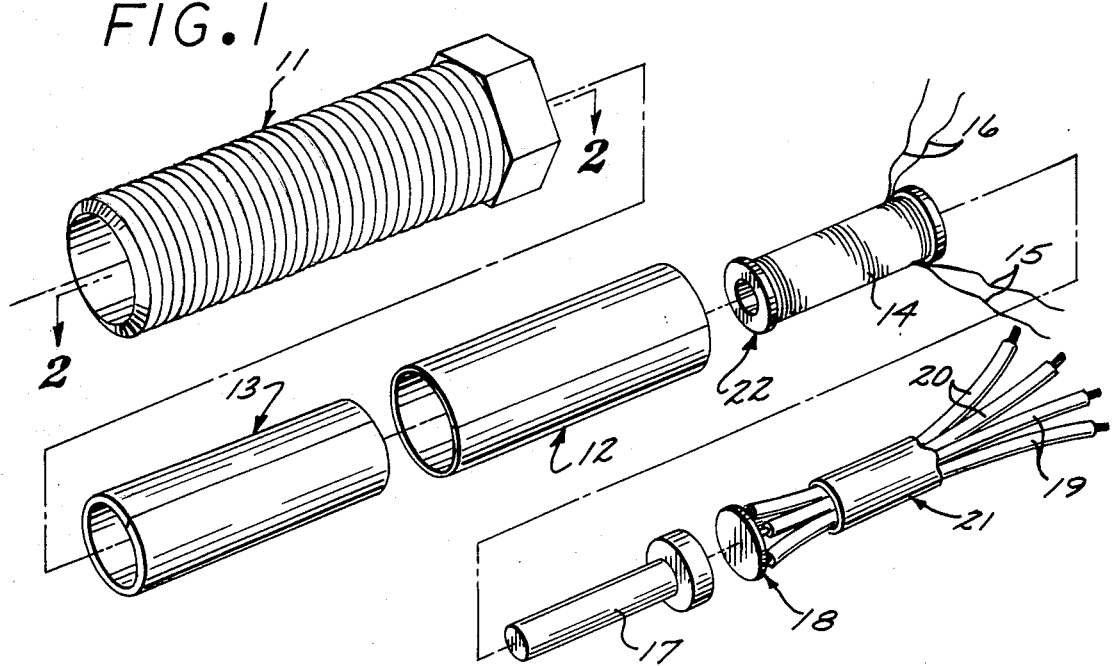
FIG. 1 is an exploded view of the dual magnetic sensor of the present invention.
Figure 2:
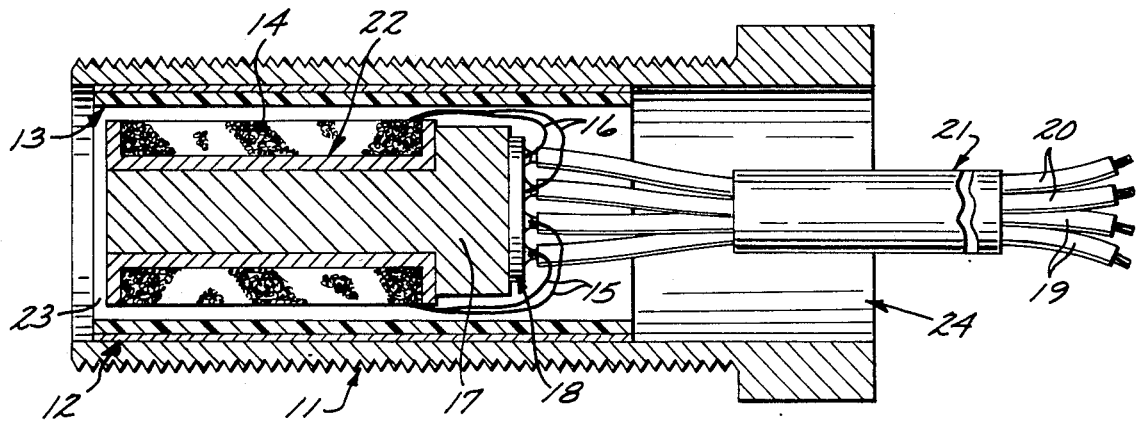
FIG. 2 is a longitudinal cross-sectional view of the assembled sensor.

As best seen in FIGS. 1 and 2, the present sensor comprises a cylindrical housing 11 which encloses a ferromagnetic sleeve or shim 12 which in turn encloses a cylindrical permanent magnet 13.

A pair of separate coils of electrically conductive wire are wound upon bobbin 22 in side-by-side relation to define a dual coil 14. The adjacent coils are electrically insulated from each other by any suitable means, such as by applying separate wire insulation to the separate coils. A conventional pole piece 17 is disposed within the bobbin 22, and the assembled pole piece 17, bobbin 22 and coil 14 are fitted within the magnet 13.

A circuit board, generally indicated at 18, is attached to an enlarged end of the pole piece 17. The board 18 facilitates connection of a pair of wires 15 from one of the dual coils to a pair of output wires 19, and connection of a similar pair of wires 16 from the other dual coil to a pair of output wires 20. The output wires 19 and 20 are conveniently held in place by a sleeve 21.

As seen in FIG. 2, suitable potting material 23, such as epoxy resin or the like, fills the spaces within the housing 11 and secures the various components in place.

Figure 3:
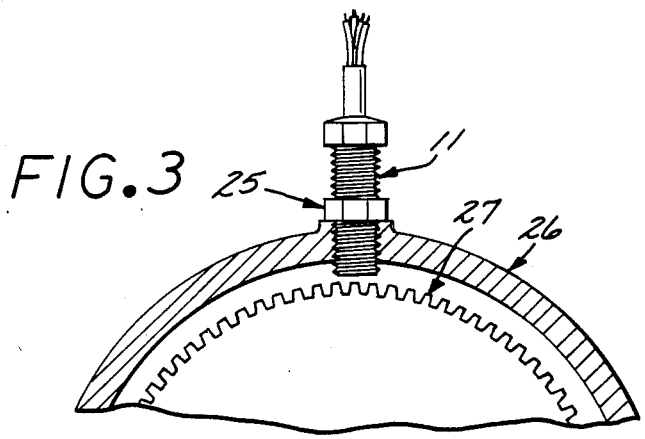
FIG. 3 is a partially diagrammatic view of the sensor mounted to a vehicle gear housing.

FIG. 3 illustrates the manner of mounting the completely assembled dual magnetic sensor upon a gearcase 26. The sensor is suitably threaded for projection of the pole piece end of the housing 11 through a threaded opening in the gearcase 26, and into proximity with the ferrous teeth of a gear 27 rotatable within the gearcase 26. A nut 25 secures the sensor in position.

In operation, passage of the teeth of gear 27 past the sensor causes a periodic change in the magnetic flux between the gear 27 and the sensor, the periodicity being indicative of the rate of rotation of the gear 27, as will be apparent. The rate of rotation is sensed equally and independently by both coil windings.

Mechanical assembly of the sensor components just described is generally similar to assembly of the components of a conventional single-coil sensor, except for the important differences incident to use of the pair of electrically isolated coil windings. Although a circuit board is described for connecting the fine coil windings to the mechanically more rugged output wires, other methods may be utilized if desired.

Shim 12 may be omitted, but it has been found that use of the shim 12 causes each separate coil winding to generate an output approximately one-third greater than the output of a conventional single-coil sensor.

The present sensor is mechanically interchangeable with a conventional single-coil sensor so that existing installations can quickly and easily be converted to provide dual output signals for use by a pair of electronic devices rather than just one. All that is necessary to accomplish this is removal of the existing single coil detector sensor, installation of the present dual coil sensor, connection of one of the coils to the existing electric device, and connection of the other coil to the new electronic device.

Various modifications and changes may be made with regard to the foregoing detailed description without departing from the spirit of the invention.

I claim:

1. A sensor comprising:
    a housing;
    an elongated cylindrical permanent magnet within said housing;
    an elongated cylindrical bobbin secured within said magnet;
    an elongated pole piece of ferromagnetic material secured within said bobbin for establishing a magnetic field adjacent an end of said bobbin;
    a pair of coils of wire coaxially wound upon and along the length of said bobbin between said end of said bobbin and the opposite end of said bobbin, said pair of coils of wire being wound upon said bobbin in adjacent, side-by-side, electrically separate and insulated relation from one another so as to sense equally and independently any disturbance of said magnetic field caused by passage of a ferromagnetic element through said magnetic field; and
    electrically conductive leads connected to said pair of coils, respectively, for separate application of the electrical outputs of said pair of coils to an external circuit.

2. The sensor of claim 1 and including a ferromagnetic shim located between said housing and said permanent magnet.

* * * * *